US010810769B2

(12) United States Patent
Schiller et al.

(10) Patent No.: US 10,810,769 B2
(45) Date of Patent: Oct. 20, 2020

(54) CONTINUOUS-CURVATURE RATIONAL CURVES FOR DRAWING APPLICATIONS

(71) Applicant: Adobe Inc., San Jose, CA (US)

(72) Inventors: Stephen Schiller, Oakland, CA (US); Zhipei Yan, College Station, TX (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 15/823,005

(22) Filed: Nov. 27, 2017

(65) Prior Publication Data

US 2019/0164318 A1   May 30, 2019

(51) Int. Cl.
*G06T 11/20*   (2006.01)
*G06F 3/0484*   (2013.01)

(52) U.S. Cl.
CPC ........ *G06T 11/203* (2013.01); *G06F 3/04847* (2013.01)

(58) Field of Classification Search
CPC .......................... G06T 11/203; G06F 3/04847
USPC .......................................... 345/418, 442, 619
See application file for complete search history.

(56) References Cited

U.S. PATENT DOCUMENTS

| 8,803,885 | B1* | 8/2014 | Carron | G06F 3/0354 |
| | | | | 345/442 |
| 9,727,987 | B2 | 8/2017 | Carr et al. | |
| 2008/0005212 | A1* | 1/2008 | Levien | G06T 11/203 |
| | | | | 708/275 |
| 2010/0165204 | A1* | 7/2010 | Huang | G06T 3/4007 |
| | | | | 348/581 |
| 2015/0062129 | A1* | 3/2015 | Wilensky | G06T 11/203 |
| | | | | 345/442 |
| 2015/0221106 | A1* | 8/2015 | Winnemoeller | G06F 3/01 |
| | | | | 345/441 |
| 2015/0371417 | A1* | 12/2015 | Angelov | G06Q 10/101 |
| | | | | 345/442 |

OTHER PUBLICATIONS

Sarfraz, Muhammad, Shamaila Samreen, and Malik Zawwar Hussain. "Modeling of 2D objects with weighted-Quadratic Trigonometric Spline." In 2016 13th International Conference on Computer Graphics, Imaging and Visualization (CGiV), pp. 29-34. IEEE, 2016.*

(Continued)

*Primary Examiner* — Sarah Lhymn
(74) *Attorney, Agent, or Firm* — F. Chau & Associates, LLC (57) ABSTRACT

Techniques of generating curves in drawing applications involve generating rational interpolating curves in response input points being specified on a display such that the rational interpolating curves have an adjustable sharpness at each of the input points. Along these lines, a user specifies control points of a curve in a drawing application by, e.g., moving these control points on a display. In response, a computer running the drawing application generates a rational interpolating curve that intersects the input points such that the curvature of each curve at its input point is a local maximum and such that the user's sharpness values change the roundness of the curve around corresponding control points.

20 Claims, 7 Drawing Sheets

(56) References Cited

OTHER PUBLICATIONS

Zhang, Y. F., F. X. Bao, C. M. Zhang, and Qi Duan. "A weighted bivariate blending rational interpolation function and visualization control." J Comput Anal Appl 14, No. 7 (2012): 1303-1320.*

Habib, Zulfiqar, Muhammad Sarfraz, and Manabu Sakai. "Rational cubic spline interpolation with shape control." Computers & Graphics 29, No. 4 (2005): 594-605.*

Schumaker, Larry I. "On shape preserving quadratic spline interpolation." SIAM Journal on Numerical Analysis 20, No. 4 (1983): 854-864.*

Lahtinen, Aatos. "On the choice of parameters in shape-preserving quadratic spline interpolation." Journal of computational and applied mathematics 39, No. 1 (1992): 109-113.*

Duan, Qi, Fangxun Bao, Shitian Du, and Edward H. Twizell. "Local control of interpolating rational cubic spline curves." Computer-Aided Design 41, No. 11 (2009): 825-829.*

Liu, Shengjun, Zhili Chen, and Yuanpeng Zhu. "Rational quadratic trigonometric interpolation spline for data visualization." Mathematical Problems in Engineering 2015 (2015) (pp. 1-21).*

Gregory, J. A., and R. Delbourgo. "Piecewise rational quadratic interpolation to monotonic data." IMA Journal of Numerical Analysis 2, No. 2 (1982): 123-130.*

Schmidt, Jochen W., and Walter Heß. "Positive interpolation with rational quadratic splines." Computing 38, No. 3 (1987): 261-267.*

Wang, Wenping, and Barry Joe. "Interpolation on quadric surfaces with rational quadratic spline curves." Computer Aided Geometric Design 14, No. 3 (1997): 207-230.*

Sederberg, T. W., "Chaper 2, Bezier Curves", BYU, Computer Aided Geometric Design Course Notes, Sep. 21, 2016, pp. 17-39.

Yan, Zhipei, et al., "k-Curves: Interpolation at Local Maximum Curvature", ACM Transactions on Graphics, vol. 36, No. 4, Article 129, Jul. 2017, 7 pages.

* cited by examiner

CONTINUOUS-CURVATURE RATIONAL CURVES FOR DRAWING APPLICATIONS

TECHNICAL FIELD

This description relates to generating curves in computer drawing applications.

BACKGROUND

Some computer-based drawing applications provide controls that enable a user to draw arbitrary curves on a display. For example, when a user of a drawing application specifies distinct control points by which a curve may be manipulated, the drawing application outputs a curve that intersects some of the control points. When the user moves a control point on the display using an input device (e.g., a mouse), the drawing application outputs a new curve.

Such a curve may take the form of an interpolating curve. Interpolating curves are continuous curves that intersect a set of specified points. The generation of an interpolating curve may involve the specification of polynomial coefficients that intersect the set of specified points and satisfy certain criteria. For example, a Lagrange interpolation produces a single interpolating polynomial curve of minimum degree that goes through each of the specified points. Conventional approaches to outputting curves in a drawing application involve generating an interpolating curve specified by the drawing application in response to a user specifying points on a display.

SUMMARY

In one general aspect, a method can include receiving, by processing circuitry configured to display user-specified drawings on a display device, point data input by a user on the display device, the point data representing a set of input points through which a rational interpolating curve is configured to intersect. The method can also include obtaining, by the processing circuitry, sharpness data representing a shape of the rational interpolating curve. The method can further include generating, by the processing circuitry, rational interpolating curve data representing the rational interpolating curve based on the point data and the sharpness data, the rational interpolating curve data including a set of weights, each of the set of weights corresponding to a respective input point and modulating an effect of a change of shape of the rational interpolating curve. The method can further include displaying as a drawing on the display device, by the processing circuitry, the rational interpolating curve based on the rational interpolating curve data, the rational interpolating curve having a local maximum of a curvature at each of the set of input points.

The details of one or more implementations are set forth in the accompanying drawings and the description below. Other features will be apparent from the description and drawings, and from the claims.

DETAILED DESCRIPTION

The above-described conventional approaches to outputting curves in a drawing application result in curves that are difficult for the user to control. For instance, interpolating curves used in such conventional approaches exhibit discontinuous behavior in response to continuous changes to the position of a control point on the display. For example, suppose that a user wants to invoke a slight change to a curve by dragging a control point on the screen a small distance. Some curves may instead exhibit large changes in curvature in response to such small changes to the input. Some interpolating curves may exhibit other undesirable behaviors such as cusps and loops away from control points. Such undesirable discontinuous behavior of the interpolating curves is difficult for the user to understand and control and may lead to a frustrating user experience in drawing curves on a display.

Other conventional approaches to outputting curves in a drawing application involve defining piecewise quadratic interpolating curves whose curvature has a local maximum at an interior control point. While such interpolating curves avoid problems such as cusps and loops, the resulting interpolating curves are constrained in the possible shapes they allow to user to produce. For example, such curves cannot reproduce a circle because they are represented by a quadratic (i.e., parabolic) function. Further, the requirement of the curvature maximum being at the interior control point removes a degree of freedom from the user to control the shape of such curves. Accordingly, while these quadratic interpolating curves provide a better experience for a novice user, they provide a less satisfying, relatively inflexible experience of a more experienced user.

In accordance with the implementations described herein and in contrast to the above-described conventional approaches to outputting curves in a drawing application, improved techniques of generating curves in drawing applications involve generating rational interpolating curves in response to input points being specified on a display such that the rational interpolating curves have a curvature maximum at each of the input points. Each input point corresponds to a simple rational curve: a rational quadratic interpolating curve. Each rational quadratic interpolating curve is a quadratic function in both the numerator and denominator. Such curves avoid the pitfalls of those generated according to the above-described conventional techniques: small changes to an input point produces small changes to the output curve.

Along these lines, suppose that a user specifies input points of a curve in a drawing application by, e.g., moving these control points on a display of a computer with an input device such as a mouse. When the curve to be drawn is an aggregation of rational quadratic interpolating curves, a computer running the drawing application generates exterior control points, i.e., the endpoints of each such curve, an off-curve control point for each rational quadratic interpolating curve. Each pair of exterior control points and an off-curve control point define a rational quadratic interpolating curve that intersects a respective input point such that the curvature of each curve at its input points is a local maximum. The generation of the control points for one rational quadratic interpolating curve depends on the control points for neighboring rational quadratic interpolating curves of a rational interpolating curve. This leads to a tridiagonal linear system to solve for the control points.

The computer may also generate a weight associated with the off-curve control point of a rational quadratic interpolating curve based on additional constraints. In some implementations, the user may also specify a sharpness (or tension) value that varies a sharpness or roundness of the rational interpolating curve. The generated and user-input shape of the curve modulate an effect of a change of position of the input point and control the sharpness or roundness of that curve in the neighborhood of the input point.

In some implementations, the computer may generate a critical weight for a curve that minimizes an eccentricity of that curve, i.e., makes the curve as close to a circular arc as possible. (NB a rational quadratic curve is equivalent to a conic; the eccentricity of such a conic depends on the weight.)

In some implementations, the computer may generate, as the weight, a power of the critical weight based on a user-specified sharpness value, i.e., according to whether the user specifies a sharper or rounder curve. In some implementations, the power may be based on an angle formed by the intersection at an off-curve control point of the tangents to the curve at the exterior control points. In some implementations, the power may be based on the discrete curvature of the curve at each of the input points. In some implementations, the power being greater than one indicates a sharper curve and the power being less than one indicates a rounder curve.

In some implementations, the computer may generate, as the weight, a multiplier of the critical weight based on a user-specified sharpness value.

In some implementations, the computer may generate, as the weight, the greater of a given weight and a quantity that is based on a specified minimum angle formed by the intersection of the tangents to the curve at the exterior control points. In some implementations, the quantity is the sine of half of the specified minimum angle.

The above-defined rational interpolating curves provide a satisfying experience for both novice and more experienced users. Such curves exhibit continuous behavior in response to continuous changes in the positions of control points. Further, such curves also provide flexibility in defining overall shape by generating to make the curve sharper or rounder in the neighborhood of specified input points as desired.

The following definitions are used for clarity in the discussion hereinafter. Input points refer to those points $p_i$ (see, e.g., FIG. 2) input by the user to define a curve. A rational interpolating curve (210 in FIG. 2) refers to the desired curve that goes through the input points and includes a set of rational quadratic interpolating curves. Each rational quadratic interpolating curve (see, e.g., 210(1) and 210(2) in FIG. 2) corresponds to an input point and is a ratio of two quadratic functions. Exterior control points $c_{i,0}$ and $c_{i,2}$ (see, e.g., FIG. 2) refer to the ends of a rational quadratic interpolating curve—these are not input by the user but are generated instead. Off-curve control points $c_{i,1}$ (see, e.g., FIG. 2) are points not on the curve but used, in concert with the exterior control points, to define the shape of each of rational quadratic interpolating curve.

Figure 1:
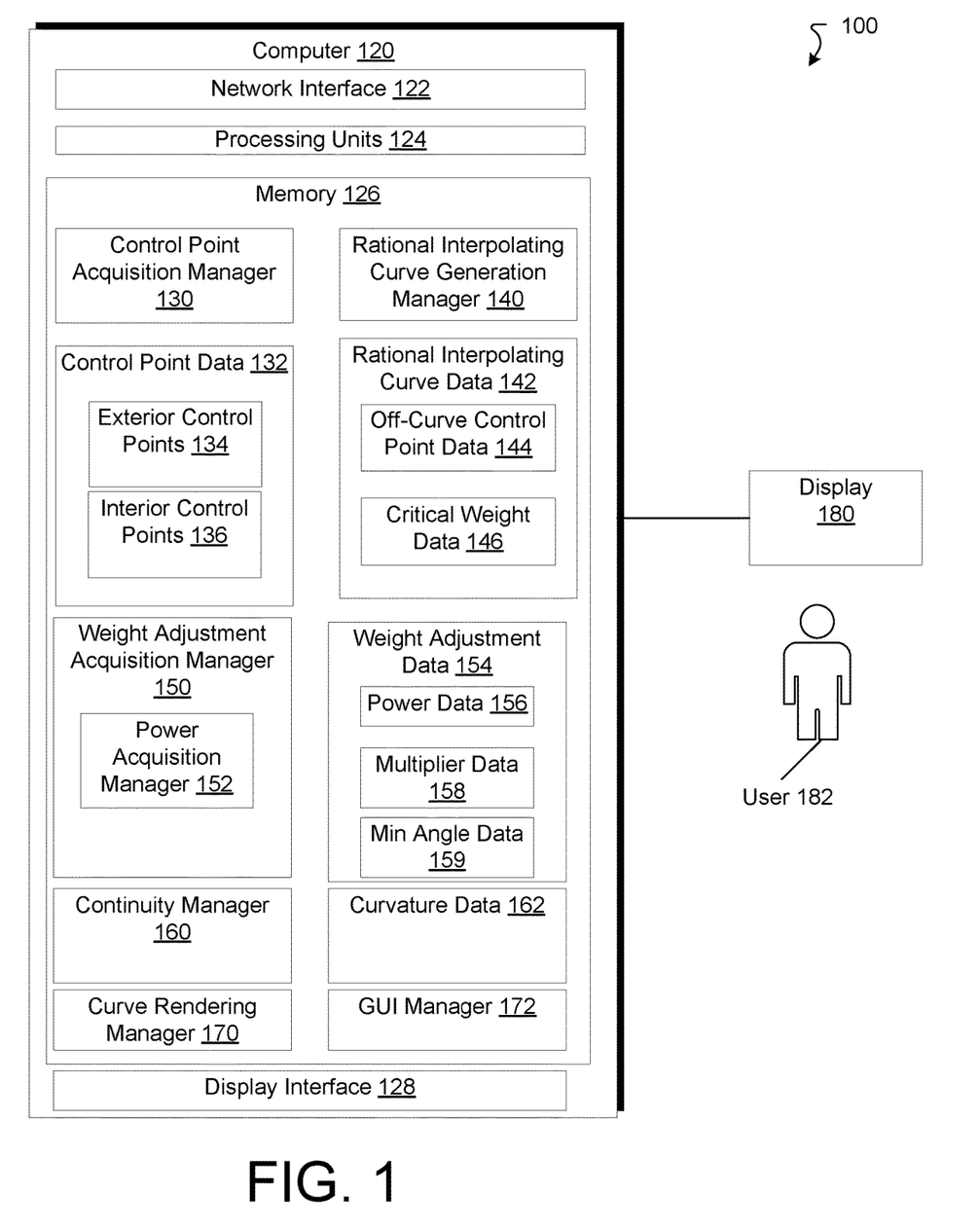
FIG. 1 is a diagram that illustrates an example electronic environment in which improved techniques described herein may be implemented.

FIG. 1 is a diagram that illustrates an example electronic environment 100 in which the above-described improved techniques may be implemented. As shown, in FIG. 1, the electronic environment 100 includes a computer 120 and a display 180 viewed by a user 182.

The computer 120 is configured to display user-specified drawings on a display device. The computer 120 includes a network interface 122, one or more processing units 124, memory 126, and a display interface 128. The network interface 122 includes, for example, Ethernet adaptors, Token Ring adaptors, and the like, for converting electronic and/or optical signals received from a network to electronic form for use by the editing computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the computer 120 can be, or can include processors (e.g., processing units 124) configured to process instructions stored in the memory 126. Examples of such instructions as depicted in FIG. 1 include a control point acquisition manager 130, a rational interpolating curve generation manager 140, a weight adjustment acquisition manager 150, a continuity manager 160, a curve rendering manager 170, and a GUI manager 172. Further, as illustrated in FIG. 1, the memory 126 is configured to store various data, which is described with respect to the respective managers that use such data.

The control point acquisition manager 130 is configured to obtain control point data 132 in response to a user input. For example, in the context of a drawing application running on the computer 120, the GUI manager 172 may output data defining an application window on the display 180 via the display interface 128. Within the application window, the user 182 may depress a "curve" button that outputs a first exterior control point in the window. The user may then click at another location in the window to produce an input point of the curve, and then a third location to produce a second exterior control point of the curve. Further clicks in the window may define other control points of an aggregate curve that is made from other curves.

The control point data 132 includes exterior control point data 134 and input point data 136. Each of the control points represented in the control point data includes a coordinate pair representing a position within the application window. Each of the exterior control points represented in the exterior control point data 134 is an endpoint of an individual curve. Each of the input points represented in the input point data 136 is a point on an individual curve.

Figure 2:
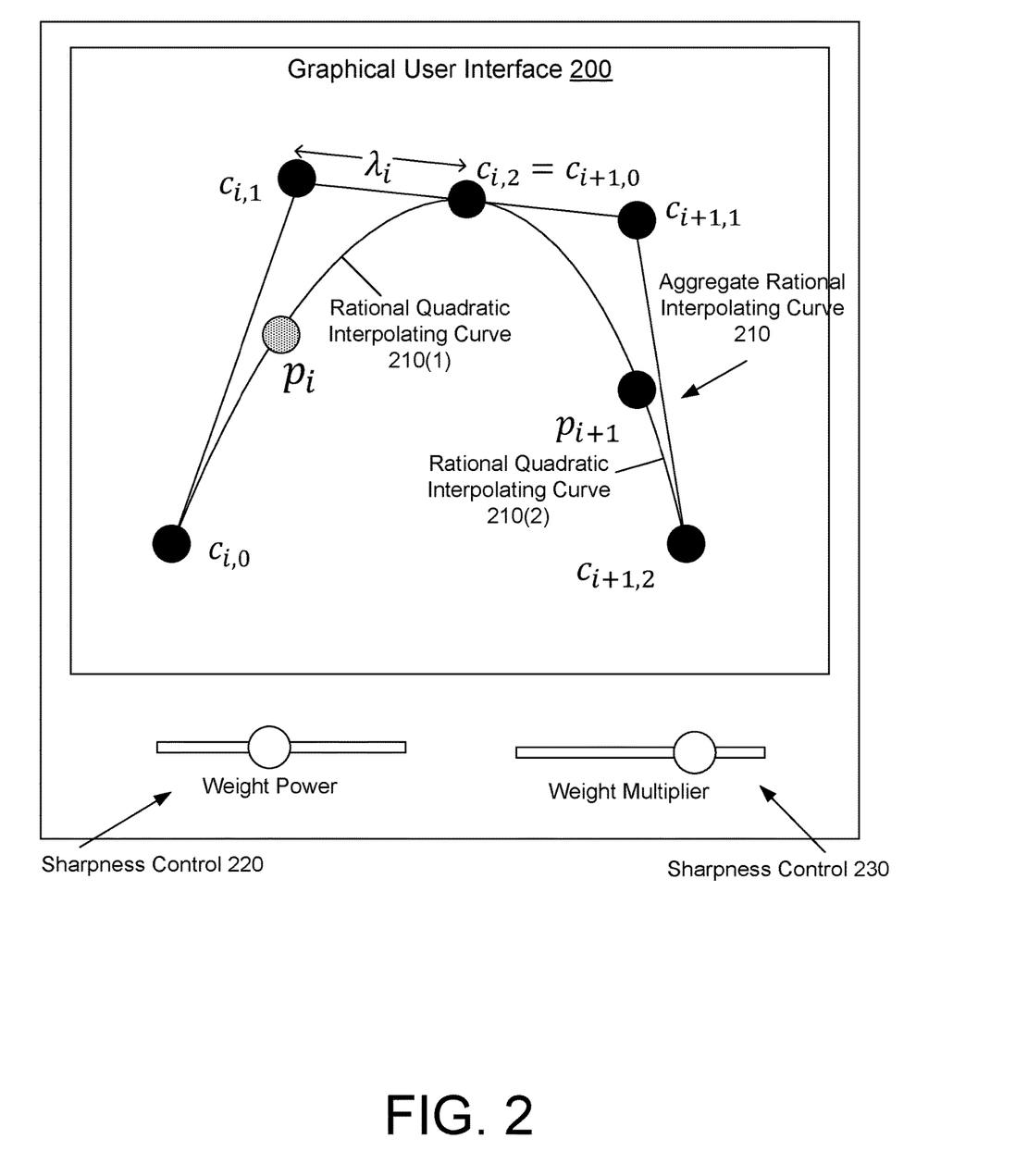
FIG. 2 is a diagram that illustrates an example, aggregated rational interpolating curve displayed on a display device within the electronic environment shown in FIG. 1.

FIG. 2 illustrates an example graphical user interface (GUI) 200 containing an application window in which these control points are defined. There are actually two curves in the application window 210(1) and 210(2). The exterior control points of the curve 210(1) are denoted as $c_{i,0}$ and $c_{i,2}$ (the index i implying that the curve 210(1) may be part of a larger aggregate curve). The input point of the curve 210(1) is on the curve and is denoted as $p_i$. Similarly, the exterior control points of the curve 210(2) are denoted as $c_{i+1,0}$ and $c_{i+1,2}$, and the input point is denoted as $p_{i+1}$.

If the curve is closed (i.e., drawn as a loop), then the indexing described above is performed modulo the number of input points N of the curve. If the curve is open then the first and last input points are duplicated at either end, i.e., the first input point is used as a first exterior control point, and the last input point is likewise used as a last exterior control point.

Returning to FIG. 1, the rational interpolating curve generation manager 140 is configured to generate rational interpolating curve data 142 based on the control point data 132. Each rational interpolating curve, here curve 210(1) of FIG. 2, takes the form of a rational quadratic as follows:

$$c_i(t) = \frac{(1-t)^2 c_{i,0} + 2t(1-t)w_i c_{i,1} + t^2 c_{i,2}}{(1-t)^2 + 2t(1-t)w_i + t^2}, \quad (1)$$

where $t \in [0,1]$, $c_{i,1}$ is an off-curve control point, and $w_i$ is a weight. Again, this curve is labeled as part of an aggregate curve containing many such rational quadratic interpolating curves. In some implementations (and those described herein), the off-curve control points are computed by the computer 120 based on the control point data 132. Nevertheless, for the purposes of discussion, it will be assumed that the off-curve control point data 144 are known.

The rational interpolating curve generation manager 140 is configured to generate the rational interpolating curve data 142 based on the constraint that the curvature of the rational quadratic interpolating curve defined in Eq. (1) has a local maximum at the input point $p_i$. Accordingly, when the input point $p_i$ defines a corresponding, unique value of the parameter $t = t_i$, i.e., $p_i = c_i(t_i)$, the parameter value $t_i$ indicates the position of maximum curvature along the curve. Using the definition of curvature $$\kappa_i(t) = \frac{|c_i'(t) \times c_i''(t)|}{|c_i'(t)|^3}, \quad (2)$$

the computer 120 may determine this unique value $t_i$ by solving the equation $$\kappa_i'(t_i) = 0, \text{ or} \quad (3)$$

$$\begin{pmatrix} (1-t_i)^4 \\ 4(1-t_i)^3 t_i \\ 6(1-t_i)^2 t_i^2 \\ 4(1-t_i)t_i^3 \\ t_i^4 \end{pmatrix}^T \cdot \begin{pmatrix} -2w_i^3|c_{i,0} - c_{i,1}|^2 + w_i(c_{i,0} - c_{i,1}) \cdot (c_{i,0} - c_{i,2}) \\ -w_i^3|c_{i,0} - c_{i,1}|^2 + \frac{1}{4}w_i^2|c_{i,0} - c_{i,2}|^2 \\ \frac{1}{2}w_i(c_{i,2} - c_{i,0}) \cdot (c_{i,0} - 2c_{i,1} + c_{i,2}) \\ -\frac{1}{4}|c_{i,0} - c_{i,2}|^2 + w_i^2|c_{i,1} - c_{i,2}|^2 \\ -w_i(c_{i,0} - c_{i,2}) \cdot (c_{i,1} - c_{i,2}) + 2w_i^3|c_{i,1} - c_{i,2}|^2 \end{pmatrix} = 0. \quad (4)$$

Combined with the equation $p_i = c_i(t_i)$, Eq. (4) represents two equations for the unknowns $c_{i,1}$ and $t_i$ given the values $c_{i,0}$, $c_{i,2}$, and $w_i$.

In some implementations, the computer 120 also generates a value of the weight, denoted herein as a critical weight 146 $w_i = w_C$ such that the eccentricity of the rational quadratic interpolating curve defined in Eq. (1) is a minimum, i.e., is as close to a circular arc as possible. The critical weight may be expressed explicitly in terms of the exterior control points and the off-curve control point as follows:

$$w_c = \frac{|\overline{c_{i,0} c_{i,2}}|}{\sqrt{2(|\overline{c_{i,0} c_{i,1}}|^2 + |\overline{c_{i,2} c_{i,1}}|^2)}}, \quad (5)$$

where $|\overline{c_{i,0} c_{i,2}}|$ is the distance between the points $c_{i,0}$ and $c_{i,2}$, and so on.

The weight adjustment acquisition manager 150 is configured to adjust the value of the weight based on sharpness value input from the user 182 relative to the critical weight 146, i.e., weight adjustment data 154. For example, the weight may be a power of the critical weight 154, i.e., $w = w_C^p$, where p represents the power data 156, based on the sharpness value input by the user 182. Along these lines, when p=0, then w=1 and the curve is a parabola having an eccentricity of 1. When p=1, then the curve has a minimum eccentricity and the curve resembles a circular arc as closely as possible. Nevertheless, when p is increased or decreased away from 1, the curve becomes respectively rounder or sharper. An example of a control that may produce a user-defined power is shown in FIG. 2, as a slide-bar selector 220 in the GUI 200.

In some implementations, the weight adjustment acquisition manager 150 may automatically generate a power based on the geometric properties of the curve. In one example, the weight adjustment acquisition manager 150 generates the power data 146 based on the angle of intersection between the tangents at each of the exterior control points of the curve. In another example, the weight adjustment acquisition manager 150 generates the power data 146 based on the discrete curvatures of the curve at each the input point. In the latter example, an expression for the power is as follows:

$$p = \frac{\cos\phi}{\cos\phi + \frac{(d_2 - d_1)^2}{d_2^2} + \frac{(d_0 - d_1)^2}{d_0^2}}, \quad (6)$$

where $\phi$ is the angle of intersection between the tangents at an off-curve control point of each of the exterior control points $c_{i,0}$ and $c_{i,2}$ and $d_j$ is the discrete curvature of the curve at the point $p_i$. The discrete curvature $d_j$ may be computed as the inverse of the radius of the circle containing the point $p_i$ and the input points of the neighboring curves $p_{i-1}$ and $p_{i+1}$.

In another example, the weight may be a multiple of the critical weight (or a power thereof) based on the multiplier data 158. The multiplier data 158 is generated in response to a sharpness value input from the user 182 when the user 182 indicates a rounder or sharper curve. An example of a control that may produce a user-defined multiplier is shown in FIG. 2, as a slide-bar selector 230 in the GUI 200.

In some implementations, the weight adjustment acquisition manager 150 is configured to compare the resulting adjustable weight against a lower bound. The lower bound may be based on a minimum allowable angle of intersection $\phi_m$ between the tangents at each of the exterior control points of the curve. In one example, the adjustable weight may be computed as follows:

$$w_i = \max\left\{\sin\frac{\phi_m}{2}, sw_C^p\right\}, \quad (7)$$

where s is the multiple of the multiplier data 158. The minimum angle $\phi_m$ may be equal to $\pi/4$, or can take values smaller and larger.

The continuity manager 160 is configured to enforce continuity conditions across multiple rational quadratic interpolation curves. Such continuity conditions may take the form of $G^0$ continuity, i.e., a right exterior control point of a first curve is coincident with the left exterior control point of a second curve neighboring the first curve to the right. With respect to the diagram in FIG. 2, the $G^0$ continuity requirement translates to the condition $$c_{i+1,0} = c_{i,2}. \quad (8)$$

Another continuity condition takes the form of $G^1$ continuity, i.e., the slope of the tangent line at the point of coincidence between two neighboring curves is continuous. Because the off-curve control points are at the points of intersections of the tangent lines at the exterior control points of the curves, then $G^1$ continuity implies that the point of coincidence and the respective off-curve control points of the curves lie on a straight line. Mathematically, this statement takes the following form:

$$c_{i,2} = (1-\lambda_i)c_{i,1} + \lambda_i c_{i+1,1}, \quad (9)$$

where $\lambda_i$ is a fraction of the distance along the line connecting the off-curve control points at which the point of coincidence lies. This geometry is illustrated in FIG. 2.

Still another continuity condition takes the form of $G^2$ continuity, i.e., the curvature of the first curve at the point of coincidence is equal to the curvature of the second curve at the point of coincidence. Mathematically, this statement takes the following form:

$$\kappa_i(1) = \kappa_{i+1}(0) \quad (10)$$

or, when combined with Eq. (9), $$\lambda_i = \frac{\frac{1}{w_i}\sqrt{\Delta(c_{i,0}, c_{i,1}, c_{i+1,1})}}{\frac{1}{w_i}\sqrt{\Delta(c_{i,0}, c_{i,1}, c_{i+1,1})} + \frac{1}{w_{i+1}}\sqrt{\Delta(c_{i,1}, c_{i+1,1}, c_{i+1,2})}}, \quad (11)$$

where $\Delta(c_{i,0}, c_{i,1}, c_{i+1,1})$ is the area of the triangle formed by the points $c_{i,0}, c_{i,1}, c_{i+1,1}$, and so on. In some implementations, enforcement of the $G^2$ continuity condition is not possible because the curves have opposite signs of the curvature at the point of coincidence. In this case, the continuity manager 160 is configured to find the value of $\lambda_i$ that minimizes the quantity $\||\kappa_i(1)|^2 - |\kappa_{i+1}(0)|^2\|$. The continuity manager 160 is configured to store such a value of $\lambda_i$ in the curvature data 162.

The curve rendering manager 170 is configured to render an aggregate rational interpolating curve (e.g., curve 210 in FIG. 2) in the GUI 200. To accomplish this, the curve rendering manager 170 is configured to determine the off-curve control points $c_{i,1}$ given the control point data 132 and the constraints determined by the maximum curvature at the input points, the continuity conditions, and minimum eccentricity conditions. The resulting equation for these off-curve control points $c_{i,1}$ for $i \in \{0, 1, \ldots, N-1\}$ is a tridiagonal system as follows:

$$\begin{pmatrix} \beta_0 & \gamma_0 & 0 & 0 & 0 & \cdots \\ \alpha_1 & \beta_1 & \gamma_1 & 0 & 0 & \cdots \\ 0 & \alpha_2 & \beta_2 & \gamma_2 & 0 & \cdots \\ 0 & 0 & \alpha_3 & \beta_3 & \gamma_3 & \cdots \\ 0 & 0 & 0 & \alpha_4 & \beta_4 & \cdots \\ \vdots & \vdots & \vdots & \vdots & \vdots & \ddots \end{pmatrix} \begin{pmatrix} c_{0,1} \\ c_{1,1} \\ c_{2,1} \\ c_{3,1} \\ c_{4,1} \\ \vdots \end{pmatrix} = \begin{pmatrix} p_0 \\ p_1 \\ p_2 \\ p_3 \\ p_4 \\ \vdots \end{pmatrix}, \text{ where} \quad (12)$$

$$\alpha_i = \frac{(1-\lambda_{i-1})(1-t_i)^2}{(1-t_i)^2 + 2t_i(1-t_i)w_i + t_i^2}, \quad (13)$$

$$\beta_i = \frac{\lambda_{i-1}(1-t_i)^2 + (1-\lambda_i)t_i^2 + 2t_i(1-t_i)w_i}{(1-t_i)^2 + 2t_i(1-t_i)w_i + t_i^2}, \quad (14)$$

$$\gamma_i = \frac{\lambda_i t_i^2}{(1-t_i)^2 + 2t_i(1-t_i)w_i + t_i^2}, \quad (15)$$

where $\lambda_{-1} = 1$ and $w_i$ is the weight for the $i^{th}$ curve.

The system of equations in Eq. (12) is not straightforward to solve because the quantities $\lambda_{i-1}, \lambda_i$, and $w_i$ depend on the off-curve control points $c_{i,1}$. Accordingly, the curve rendering manager 170 is configured to solve the system in Eq. (12) iteratively until convergence is achieved. Such a solution is discussed in further detail with regard to FIG. 4.

The components (e.g., modules, processing units 124) of the computer 120 can be configured to operate based on one or more platforms (e.g., one or more similar or different platforms) that can include one or more types of hardware, software, firmware, operating systems, runtime libraries, and/or so forth. In some implementations, the components of the computer 120 can be configured to operate within a cluster of devices (e.g., a server farm). In such an implementation, the functionality and processing of the components of the computer 120 can be distributed to several devices of the cluster of devices.

The components of the computer 120 can be, or can include, any type of hardware and/or software configured to process attributes. In some implementations, one or more portions of the components shown in the components of the computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the computer 120 can be, or can include, a software module configured for execution by at least one processor (not shown). In some implementations, the functionality of the components can be included in different modules and/or different components than those shown in FIG. 1.

In some embodiments, one or more of the components of the computer 120 can be, or can include, processors configured to process instructions stored in a memory. For example, an control point acquisition manager 130 (and/or a portion thereof), a rational interpolating curve generation manager 140 (and/or a portion thereof), a weight adjustment acquisition manager 150 (and/or a portion thereof), a continuity manager 160 (and/or a portion thereof), a curve rendering manager 170 (and/or a portion thereof), and a GUI manager 172 (and/or a portion thereof) can be a combination of a processor and a memory configured to execute instructions related to a process to implement one or more functions.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the editing computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the editing computer 120. As illustrated in FIG. 1, the memory 126 is configured to store various data, including control point data 132, rational interpolating curve data 142, and weight adjustment data 154.

Figure 3:
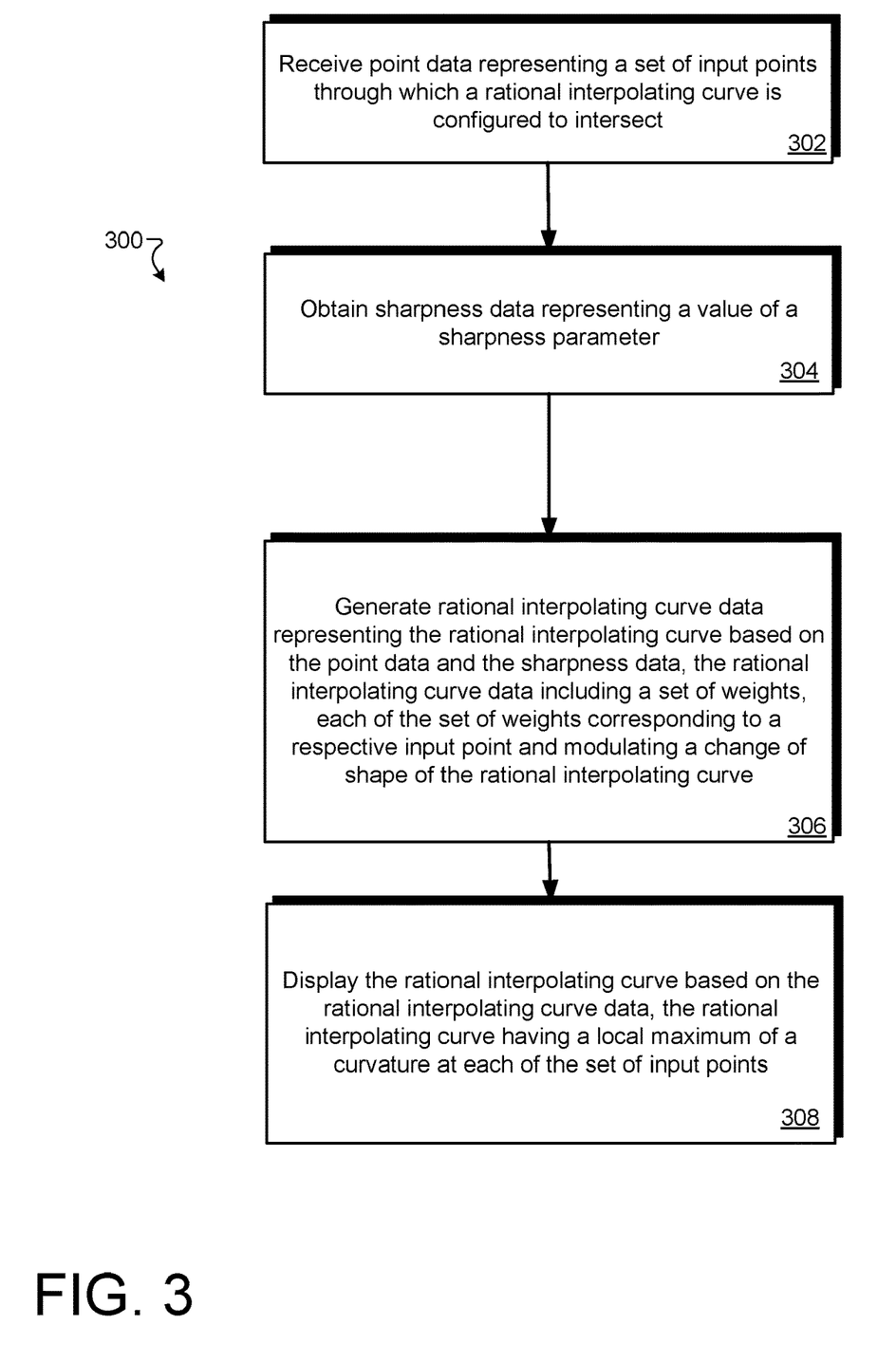
FIG. 3 is a flow chart that illustrates an example method of implementing the improved techniques as shown in the electronic environment in FIG. 1.

FIG. 3 is a flow chart depicting an example method 300 of displaying user-specified drawings on a display device. The method 300 may be performed by software constructs described in connection with FIG. 1, which reside in memory 126 of the computer 120 and are run by the set of processing units 124.

At 302, the control point acquisition manager 130 (FIG. 1) receives point data representing input points. Herein, as described above, the curve to be represented is an aggregation of rational quadratic interpolation curves as defined in Eq. (1). Each such curve is defined by a pair of exterior control points and an off-curve control point to be determined based on the set of input points.

At 304, the weight adjustment acquisition manager 150 obtains weight data representing a value of each of a set of weights. Each of the set of weights corresponds to a respective input point. From Eq. (1), one may see that the weight most strongly modifies the coefficient of the off-curve control point. Again, the weight may be partially or completely specified by the user or may be partially or completely generated by the computer 120 based on the input points.

At 306, the rational interpolating curve generation manager 140 and curve rendering manager 170 generate rational interpolating curve data based on the point data and the weight data, the rational interpolating curve data having a local maximum of a curvature at each of the set of input points. Each of the set of weights modulates an effect of a change of position of the off-curve control point to which that weight corresponds on the rational interpolating curve data.

At 308, the GUI manager 172 displays representations of the exterior control points, the set of input points, and a rational interpolating curve representing the rational interpolating curve data on the display device. The rational interpolating curve intersects the exterior control points and the set of input points as shown in FIG. 2. Nevertheless, the curves that are rendered by the computer 120 are partially defined by the off-curve control points and the computer 120 determines those via the system of equations in Eq. (12). A solution of this system is discussed with regard to FIG. 4.

Figure 4:
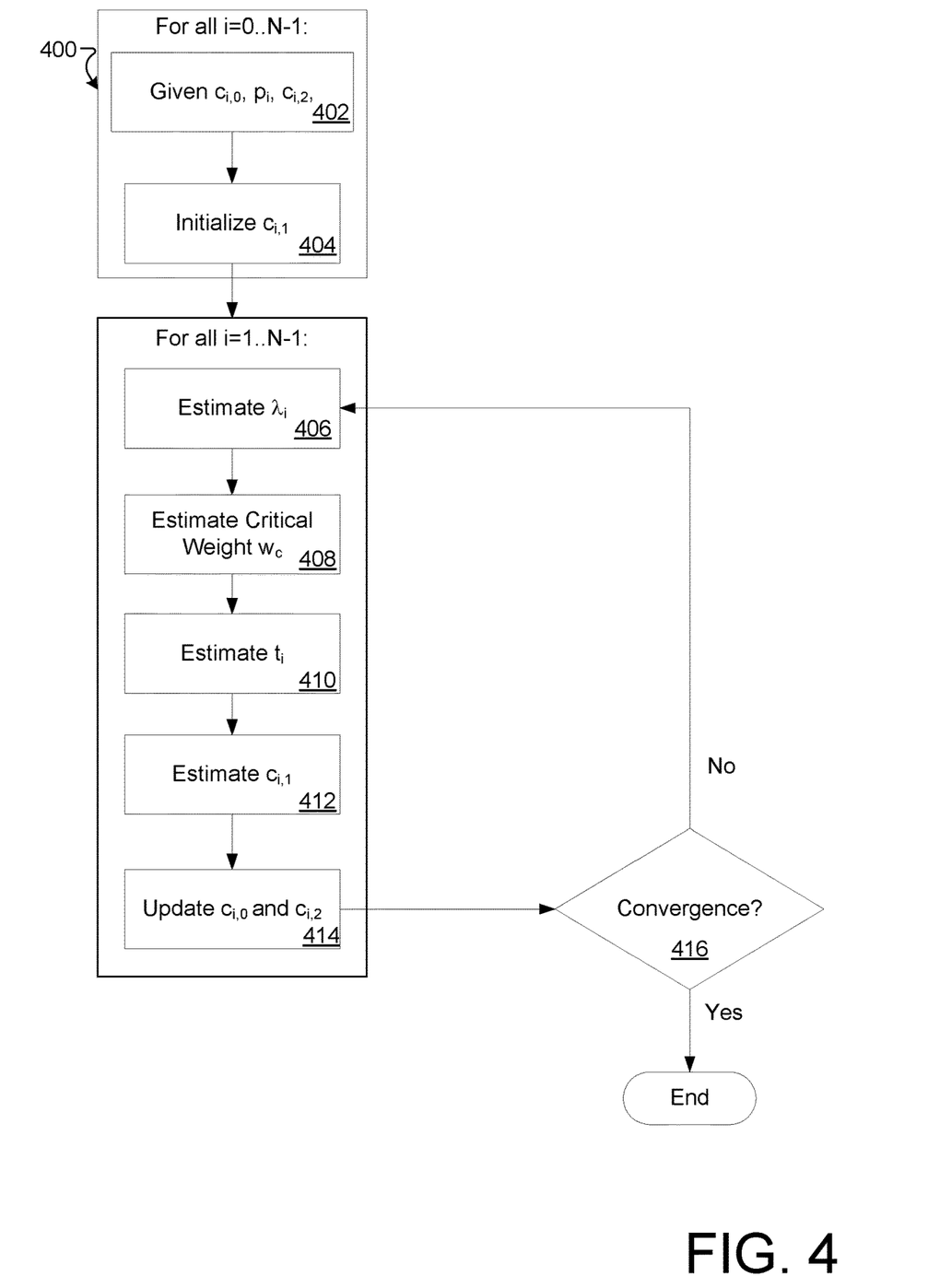
FIG. 4 is a flow chart that illustrates an example process of generating rational interpolating curve data according to the improved techniques shown in the electronic environment in FIG. 1.

FIG. 4 is a flow chart illustrating an example process 400 of rendering an aggregate rational interpolating curve. The process 400 may be performed by software constructs described in connection with FIG. 1, which reside in memory 126 of the computer 120 and are run by the set of processing units 124.

At 402, the computer 120 receives the input points $p_i$ for each curve.

At 404, the computer 120 initializes the position of the off-curve control point $c_{i,1}$ to be, e.g., $p_1$.

At 406, the computer 120 estimates the value of $\lambda_i$ based on the solution to Eq. (11).

At 408, the computer 120 estimates the value of the critical weight $w_C$ based on the result in Eq. (5).

At 410, the computer 120 estimates the value of the parameter $t_i$ based on the curvature maximization equation in Eq. (4).

At 412, the computer 120 solves the system in Eq. (12) to produce new estimates of the off-curve control points $c_{i,1}$.

At 414, the computer 120 updates the values of $c_{i,0}$ and $c_{i,2}$ using Eq. (9).

At 416, the computer 120 compares the previous values of the exterior control points and off-curve control points to the current values of the exterior control points and off-curve control points and determines whether there has been sufficient convergence. One criterion of sufficient convergence takes the form of whether the sum of the square distances between previous and current exterior control points and off-curve control points is less than some specified tolerance. If such convergence has been achieved, then the curve is considered rendered. If not, then the process returns to 406 and iterates.

The process 400 results in a curve that automatically renders on the display 180 without any input from the user 182 besides the control points. Nevertheless, the user 182 still has degrees of freedom to exploit as discussed above. The integration of this user input into the rendering of the curve is discussed with regard to FIG. 5.

Figure 5:
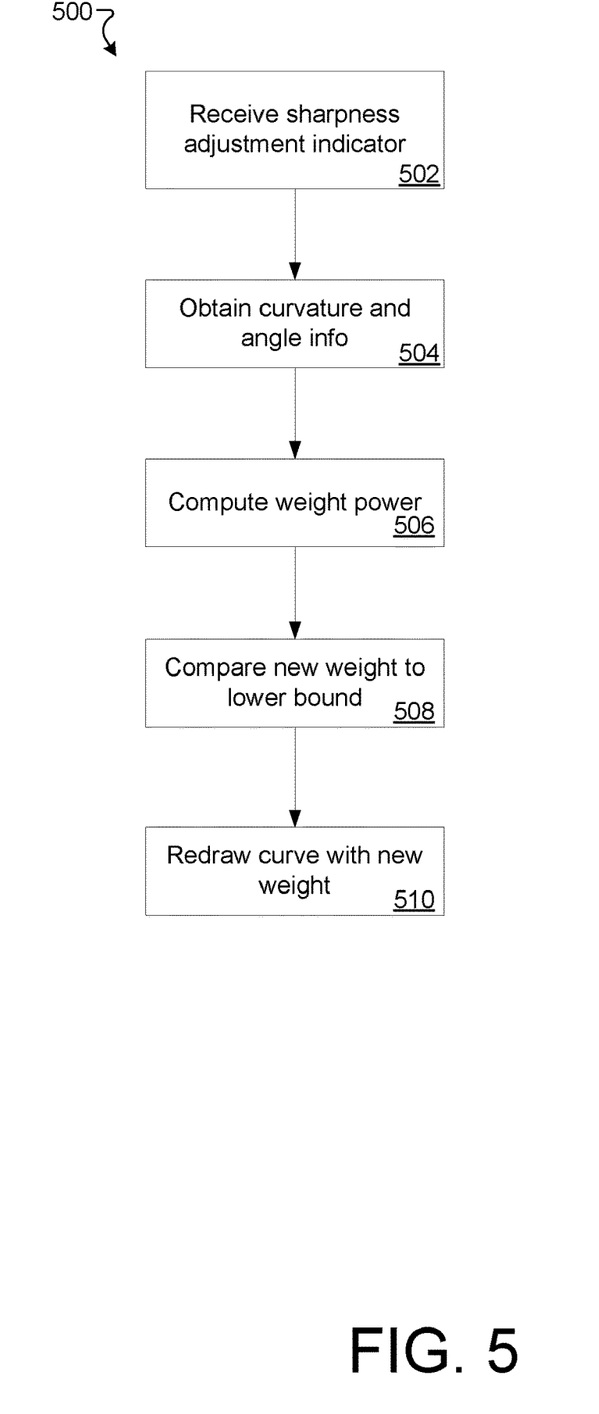
FIG. 5 is a flow chart that illustrates an example process of adjusting a curve as displayed on the display device in response to receiving sharpness adjustments according to the improved techniques shown in the electronic environment in FIG. 1.

FIG. 5 is a flow chart illustrating another example process 500 of rendering an aggregate rational interpolating curve. The process 400 may be performed by software constructs described in connection with FIG. 1, which reside in memory 126 of the computer 120 and are run by the set of processing units 124.

At 502, the computer 120 receives an indication of an adjustment to the sharpness or roundness of the curve 210 at some control point. For example, the user 182 may use the slider control 230 to generate a multiplier for the weight.

At 504, the computer 120 obtains tangent angle of intersection (i.e., subtending angle at the off-curve control point) information and curvature values at the control points. This information may be used in conjunction with determining a value of the power of the critical weight.

At 506, the computer 120 computes the power of the critical weight based on the information obtained at 504 using Eq. (6).

At 508, the computer 120 computes the weight using the multiplier times the critical weight raised to the power. The computer 120 then compares this weight with a lower bound as defined in Eq. (7), with the larger of the two quantities being the weight used in re-rendering the curve.

At 510, the computer 120 redraws the curve on the display 180.

Figure 6:
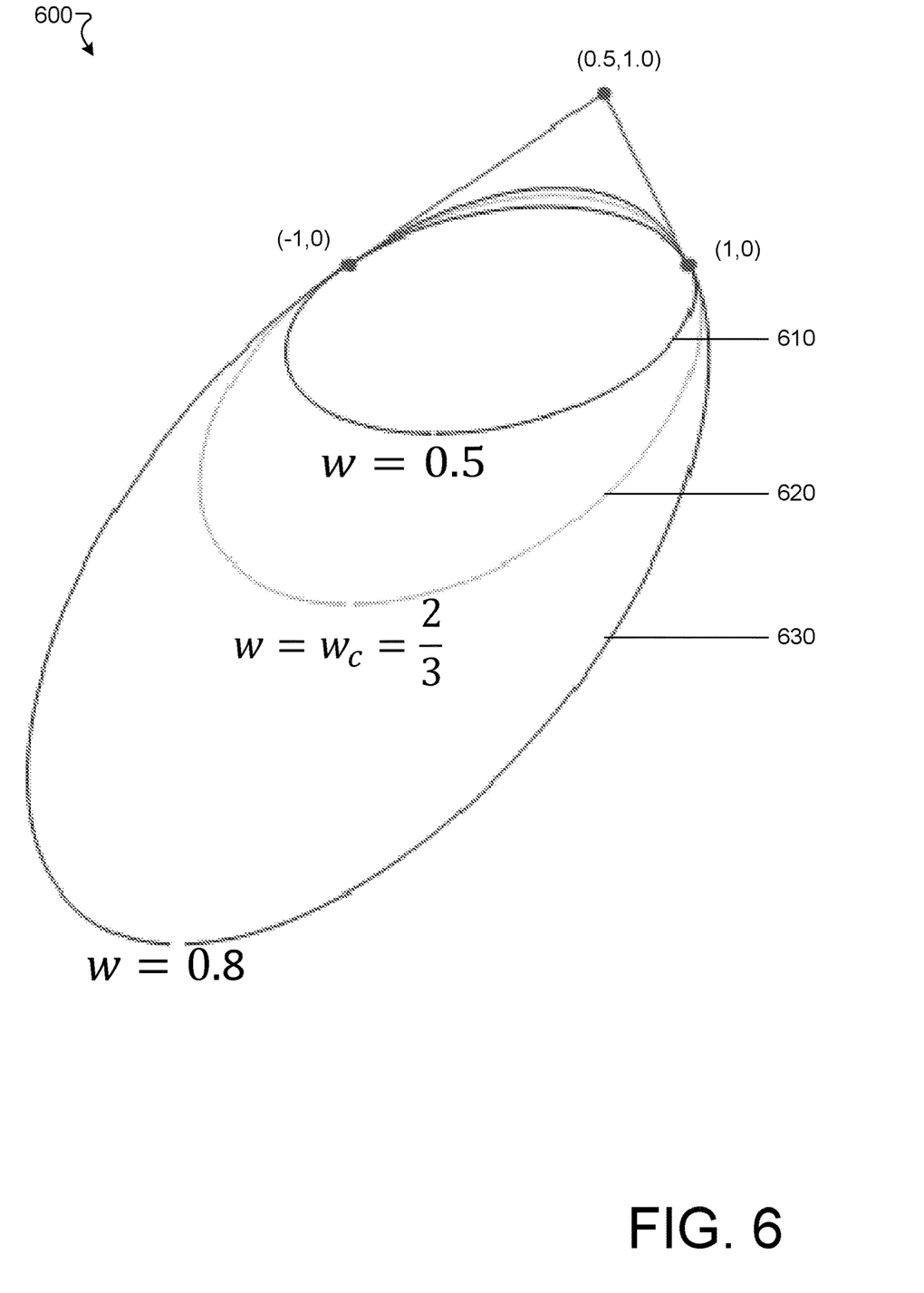
FIG. 6 is a diagram that illustrates example curves with varying weights according to the improved techniques shown in the electronic environment in FIG. 1.

FIG. 6 is a diagram illustrating an example set of ellipses 600 that vary according to the value of the weight. The critical weight at which the weight is equal to ⅔ represents the ellipse 620 that has the smallest eccentricity, i.e., the most circular. Note that this least-eccentric ellipse is not a circle necessarily. Decreasing the weight to 0.5 increases the eccentricity of the ellipse 610 in one direction (i.e., essentially horizontal) while increasing the weight to 0.8 increases the eccentricity of the ellipse 630 in the other direction.

Figure 7:
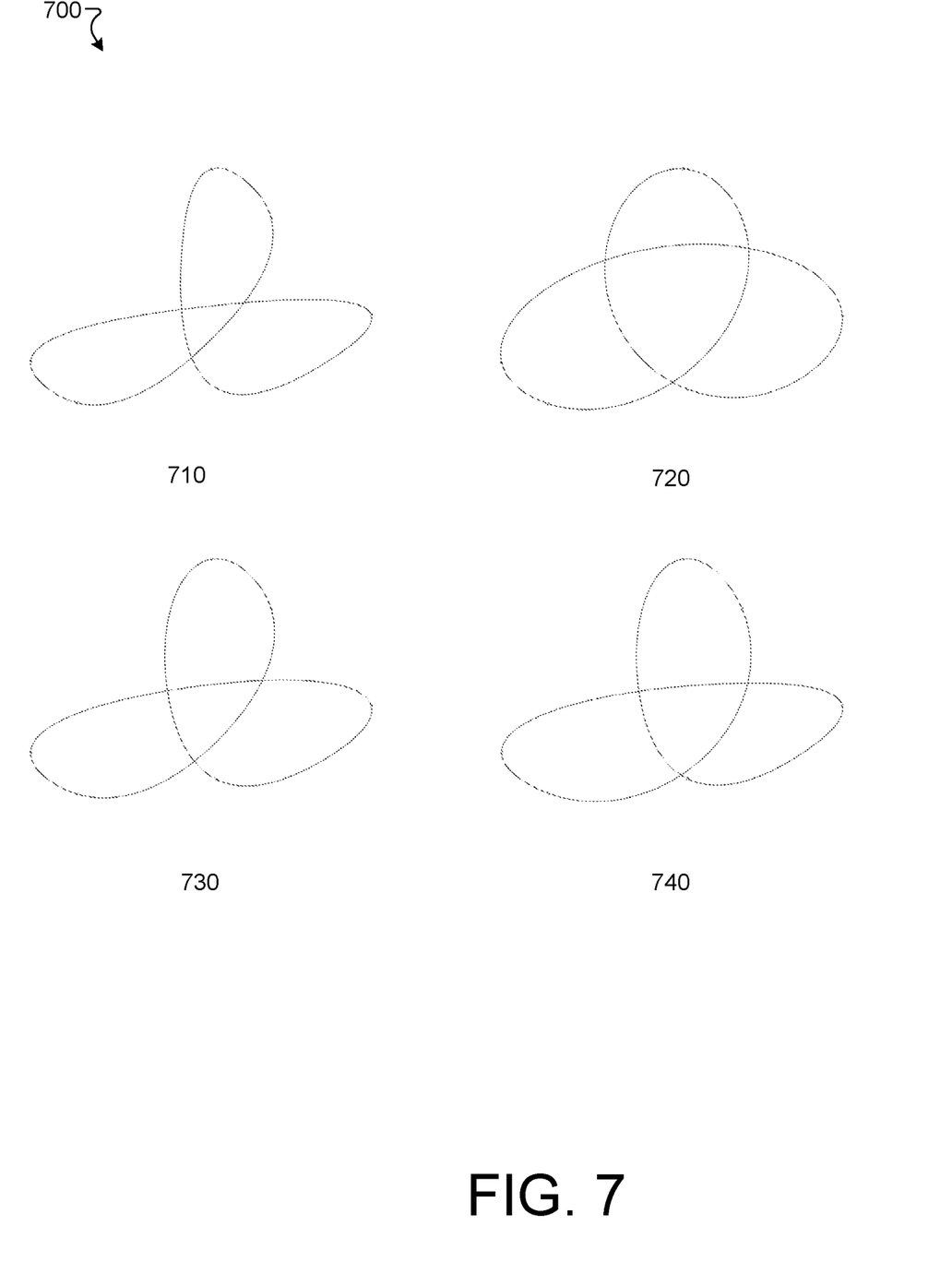
FIG. 7 is a diagram that illustrates curves with varying powers of a critical weight according to the improved techniques shown in the electronic environment in FIG. 1.

FIG. 7 is a diagram illustrating example set of curves 710, 720, 730, and 740 that vary based on the power of the critical weight.

At 710, the curve has a power value p=0. In this case, the individual rational quadratic interpolating curves reduce to parabolas used in some conventional approaches described above. Accordingly, these curves are difficult to manipulate from a user perspective and do not offer very much flexibility.

At 720, the curve has a power value p=1. In this case, the individual curves resemble circular arcs rather than parabolas. This curve may be the curve seen initially by the user and may be adjusted to be sharper accordingly.

At 730, the curve has a power value depending on angle subtended by the off-curve control point. At 740, the curve has a power value depending on the curvatures at each of the control points as described above in Eq. (6).

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
    receiving point data input by a user, the point data representing a set of input points;
    generating a rational interpolating curve based on the point data, wherein the rational interpolating curve comprises a plurality of rational quadratic curves configured such that each of the rational quadratic interpolating curves has a local maximum of curvature at one of the input points; and
    displaying the rational interpolating curve to the user.

2. The method as in claim 1, further comprising:
    receiving a sharpness value from the user, wherein the sharpness value indicates a desired curvature at an input point, wherein the rational interpolating curve is generated based on the sharpness value.

3. The method as in claim 2, wherein generating the rational interpolating curve includes, for a rational quadratic interpolating curve of the plurality of rational quadratic interpolating curves, the rational quadratic interpolating curve intersecting the input point:
    generating a weight corresponding to an eccentricity of the rational quadratic interpolating curve based on the sharpness value, wherein the rational quadratic interpolating curve is generated based on the weight.

4. The method as in claim 3, wherein generating the weight comprises:
    obtaining power data representing a power to which a critical weight is raised; and
    wherein generating the rational interpolating curve further includes:
        setting the weight corresponding to the rational quadratic interpolating curve to be the critical weight raised to the power.

5. The method as in claim 4, further comprising:
    identifying a left exterior control point and a right exterior control point corresponding to the rational quadratic interpolating curve; and
    wherein obtaining the power data includes generating the power based on the left exterior control point and the right exterior control point.

6. The method as in claim 5, wherein obtaining the power data further includes:
    generating a center discrete curvature of the rational quadratic interpolating curve at the input point;
    generating a left discrete curvature of the rational quadratic interpolating curve at an input point of a left rational quadratic interpolating curve; and
    generating a right discrete curvature of the rational quadratic interpolating curve at an input point of a right rational quadratic interpolating curve;
    wherein the power is based on the center discrete curvature, the left discrete curvature, and the right discrete curvature.

7. The method as in claim 4, further comprising:
    identifying a left exterior control point and a right exterior control point associated with the rational quadratic interpolating curve; and
    wherein obtaining the power data includes:
        generating an angle between a tangent to the rational quadratic interpolating curve at the left exterior control point and a tangent to the rational quadratic interpolating curve at the right exterior control point;
        wherein the power is based on the angle.

8. The method as in claim 4, further comprising:
    identifying a left exterior control point and a right exterior control point associated with the rational quadratic interpolating curve; and
    wherein generating the rational interpolating curve further includes:
        in response to the critical weight raised to the power being less than a specified value, producing, as the weight corresponding to the input point intersected by the rational quadratic interpolating curve, the specified value.

9. A computer program product comprising a nontransitory storage medium, the computer program product including code that, when executed by processing circuitry of a computer configured to display drawings on a display device, causes the processing circuitry to perform a method, the method comprising:

receiving point data input from a user on the display device, the point data representing a set of input points;

generating a rational interpolating curve comprising a plurality of rational quadratic curves configured such that each of the rational quadratic interpolating curves has a local maximum of curvature at one of the input points; and displaying the rational interpolating curve to the user.

10. The computer program product as in claim 9, wherein the method further comprises:

receiving a sharpness value from the user, wherein the sharpness value indicates a desired curvature at an input point; and wherein the rational interpolating curve is generated based on the sharpness value.

11. The computer program product as in claim 10, wherein generating the rational interpolating curve includes, for a rational quadratic interpolating curve of the plurality of rational quadratic interpolating curves:

generating a weight corresponding to an eccentricity of the rational quadratic interpolating curve based on the sharpness value, wherein the rational quadratic interpolating curve is generated based on the weight.

12. The computer program product as in claim 11, wherein generating the weight comprises:

obtaining power data representing a power to which a critical weight is raised; and wherein generating the rational interpolating curve further includes:

setting the weight corresponding to the rational quadratic interpolating curve to be the critical weight raised to the power.

13. The computer program product as in claim 12, further comprising:

identifying a left exterior control point and a right exterior control point corresponding to the rational quadratic interpolating curve; and wherein obtaining the power data includes generating the power based on the left exterior control point and the right exterior control point.

14. The computer program product as in claim 9, wherein a first rational quadratic interpolating curve of the plurality of rational quadratic interpolating curves is associated with a first left exterior control point and a first right exterior control point, wherein a second rational quadratic interpolating curve of the set of rational quadratic interpolating curves is associated with a second left exterior control point and a second right exterior control point, the first right exterior point being co-located with the second left exterior point, and the method further comprising:

adjusting the first rational quadratic interpolating curve and the second rational quadratic interpolating curve on the display device to display the rational interpolating curve, the rational interpolating curve having a continuous curvature at the first right exterior control point.

15. The computer program product as in claim 14, the method further comprising identifying (i) a first off-curve control point that is a point of intersection between a tangent to the rational quadratic interpolating curve at the first left exterior control point and a tangent to the rational quadratic interpolating curve at the first right exterior control point and (ii) a second off-curve control point that is a point of intersection between a tangent to the rational quadratic interpolating curve at the second left exterior control point and a tangent to the rational quadratic interpolating curve at the second right exterior control point;

wherein adjusting the first rational quadratic interpolating curve and the second rational quadratic interpolating curve on the display device includes:

defining a line on which the first off-curve control point, the first right exterior control point, and the second off-curve control point may be located; and producing a fraction of the distance between the first off-curve control point and the second off-curve control point that the first right exterior control point is on the line so that the rational interpolating curve has a continuous curvature at the first right exterior control point.

16. An electronic apparatus configured to display drawings on a display device, the electronic apparatus comprising:

a network interface;

a memory; and controlling circuitry coupled to the memory, the controlling circuitry being configured to:

receive point data input by a user on the display device, the point data representing a set of input points;

generate a rational interpolating curve comprising a plurality of rational quadratic curves configured such that each of the rational quadratic interpolating curves has a local maximum of curvature at one of the input points; and display the rational interpolating curve to the user.

17. The electronic apparatus as in claim 16, wherein the controlling circuitry is further configured to:

receive a sharpness value from the user, wherein the sharpness value indicates a desired curvature at an input point, wherein the rational interpolating curve is generated based on the sharpness value.

18. The electronic apparatus as in claim 17, wherein generating the rational interpolating curve data includes, for a rational quadratic interpolating curve of the plurality of rational quadratic interpolating curves, the rational quadratic interpolating curve intersecting the input point:

generating a weight corresponding to the input point intersected by the rational quadratic interpolating curve.

19. The electronic apparatus as in claim 18, wherein the controlling circuitry is further configured to:

obtain power data representing a power to which a critical weight is raised;

wherein the controlling circuitry is further configured to:

set the weight corresponding to the input point intersected by the rational quadratic interpolating curve to be the critical weight raised to the power.

20. The electronic apparatus as in claim 19, wherein the controlling circuitry is further configured to:

identify a left exterior control point and a right exterior control point associated with the rational quadratic interpolating curve; and wherein the controlling circuitry is further configured to generate the power based on the left exterior control point and the right exterior control point.

* * * * *